(12) United States Patent
Thirumal

(10) Patent No.: US 8,843,512 B2
(45) Date of Patent: Sep. 23, 2014

(54) PRESENTING RESULTS WITH VISUAL CUES

(75) Inventor: Sathia Thirumal, Bothell, WA (US)

(73) Assignee: Microsoft Corporation, Redmond, WA (US)

( * ) Notice: Subject to any disclaimer, the term of this patent is extended or adjusted under 35 U.S.C. 154(b) by 347 days.

(21) Appl. No.: 13/093,856

(22) Filed: Apr. 26, 2011

(65) Prior Publication Data

US 2012/0278351 A1 Nov. 1, 2012

(51) Int. Cl.
*G06F 17/30* (2006.01)

(52) U.S. Cl.
CPC .................. *G06F 17/30554* (2013.01)
USPC ......................................................... 707/769

(58) Field of Classification Search
USPC ......................................................... 707/769
See application file for complete search history.

(56) References Cited

U.S. PATENT DOCUMENTS

| | | | |
|---|---|---|---|
| 6,338,055 B1 | 1/2002 | Hagmann et al. | |
| 6,977,992 B2 | 12/2005 | Zirngibl et al. | |
| 6,988,098 B2 | 1/2006 | Sonkin et al. | |
| 7,546,291 B2 | 6/2009 | Selca et al. | |
| 7,725,534 B2 | 5/2010 | Fishhaut et al. | |
| 2009/0254825 A1 | 10/2009 | Sichart et al. | |
| 2009/0265370 A1 | 10/2009 | Rucker et al. | |

OTHER PUBLICATIONS

"Excel Services Technical Overview", Retrieved at <<http://msdn.microsoft.com/en-us/library/aa972194%28v=office.12%29.aspx>>, Nov. 2006, pp. 19.
"SQL Server 2005 Compact Edition Data Access with the SglCeResultSet and Visual C#.Net",Retrieved at<< http://msdn.microsoft.com/en-us/library/bb219485%28v=sgl.90%29.aspx>>, Jan. 2007, pp. 17.
"Best Practices for Data Warehousing with SQL Server 2008", Retrieved at<<http://msdn.microsoft.com/en-us/library/cc719165%28SQL.100%29.aspx>, Jul. 2008, pp. 35.

*Primary Examiner* — Huawen Peng
(74) *Attorney, Agent, or Firm* — Tom Wong; Jim Ross; Micky Minhas

(57) ABSTRACT

Concepts and technologies are described herein for presenting results with visual cues. A differencing tool is executed by a client or a server computer. The differencing tool is configured to generate or receive queries for querying data, and to obtain results satisfying the queries. The differencing tool further is configured to generate views for presenting the results. The views can include representations of data corresponding to the results. The differencing tool also can store history files including data that indicates values associated with one or more iterations of the results.

18 Claims, 7 Drawing Sheets

↙ 400A

| CustomerID | CompanyName | ContactName | ContactTitle | |
|---|---|---|---|---|
| AROUT | Hardy Assoc. | Thomas Hardy | Owner | ←402A |
| YUGHN | Timeby, LLC | Tim Parker | Sales Rep. | ←402B |
| MHUEM | Meddev, Inc. | Matthew Hueman, MD | Owner | ←402C |
| LROEL | Nesanel Ltd. | Sarah Lascano | Sales Rep. | ←402D |
| MBERG | Bergstein Assoc. | Morris Bergstein | Procurement | ←402E |
| ALKFI | AlfansoName2 | Alfanso Masterino | Owner | ←402F |
| MONTY | Whizzo Chocolates | Eric Hoffaby | Owner | ←402G |

| CustomerID | CompanyName | ContactName | ContactTitle | |
|---|---|---|---|---|
| AROUT | Hardy Assoc. | Thomas Hardy | Owner | |
| YUGHN | Timeby, LLC | Tim Parker | Sales Rep. | |
| MHUEM | Meddev, Inc. | Matthew Hueman, MD | Owner | |
| LROEL | Nesanel Ltd. | Sarah Lascano | Sales Rep. | |
| MBERG | Bergstein Assoc. | Morris Bergstein | Procurement | |
| ALKFI | AlfansoName3 | Alfanso Masterino | Owner | ←402F |
| MONTY | Whizzo Chocolates | Eric Hoffaby | Owner | |

PRESENTING RESULTS WITH VISUAL CUES

BACKGROUND

Some applications, in response to various user actions, perform a number of operations that change data associated with the applications. For example, some applications perform one or more, or a series, of structured query language ("SQL") operations that change a data state in response to user actions. Some state changes may be easily detected. For example, a user may intentionally create, update, or delete a record.

Other state changes, however, may not be readily detected. For example, a state change may be experienced by underlying, hidden, or background data in response to various operations, some or all of which may be unintentionally made. Thus, changes to the data may go undetected, or may be detected, if at all, long after the changes occur. Searching for changes to the data may require labor intensive and/or resource consuming symptomatic gestures and/or guesswork conducted by the user to understand data changes. Furthermore, when data changes are detected, it may be difficult, if not impossible, to determine how and/or when the data changed.

It is with respect to these and other considerations that the disclosure made herein is presented.

SUMMARY

Concepts and technologies are described herein for presenting results with visual cues. In accordance with the concepts and technologies disclosed herein, a differencing tool is executed by a client or a server computer. The differencing tool is configured to generate or receive queries for querying data hosted by a datastore in communication with the client or server computer. The differencing tool also is configured to receive results satisfying the queries. The queries can be received or otherwise obtained from the datastore or another device configured to execute queries against the data stored at the datastore.

The differencing tool further is configured to generate a view for presenting the results to a user or other entity. The view can include a grid view or other representation of data corresponding to the results, as well as controls for accessing additional functionality associated with the differencing tool. Furthermore, the differencing tool can store history data indicating values and/or time information associated with one or more iterations of the results. This history data can be stored as history files at the client or at data storage devices accessible by the client.

According to one aspect, a client executes a differencing tool that submits queries to a datastore. Results satisfying the queries are received by the differencing tool. The differencing tool generates hash values corresponding to the results and generates a view based upon the results for presentation to a user or other entity. The values associated with the results are stored in history files in memory or in other suitable data storage devices. In some embodiments, the values are stored with time information indicating when the values for the results are received.

According to another aspect, the differencing tool resubmits the query to the datastore upon expiration of a timer or when the results for the query are received. Each set of results are hashed by the differencing tool and stored at a data storage device. The hash values associated with two or more iterations of results are compared, and the view is updated to indicate changes detected based upon the comparison of the hash values. The changes can be indicated by changing data corresponding to the vales and/or by presentation of visual cues such as color changes, text changes, animation, sounds, and the like.

According to another aspect, history information for values presented in the view can be accessed by a user or other entity. In some embodiments, the view includes controls for accessing the history. The history can be presented in response to selection of the control, and can indicate values associated with the results over time as well as time information, links, and/or other information associated with the values.

It should be appreciated that the above-described subject matter may be implemented as a computer-controlled apparatus, a computer process, a computing system, or as an article of manufacture such as a computer-readable storage medium. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIGS. 4A-4B are data structure diagrams illustrating example tables of data monitored by a differencing tool, according to various embodiments.

DETAILED DESCRIPTION

Figure 1:
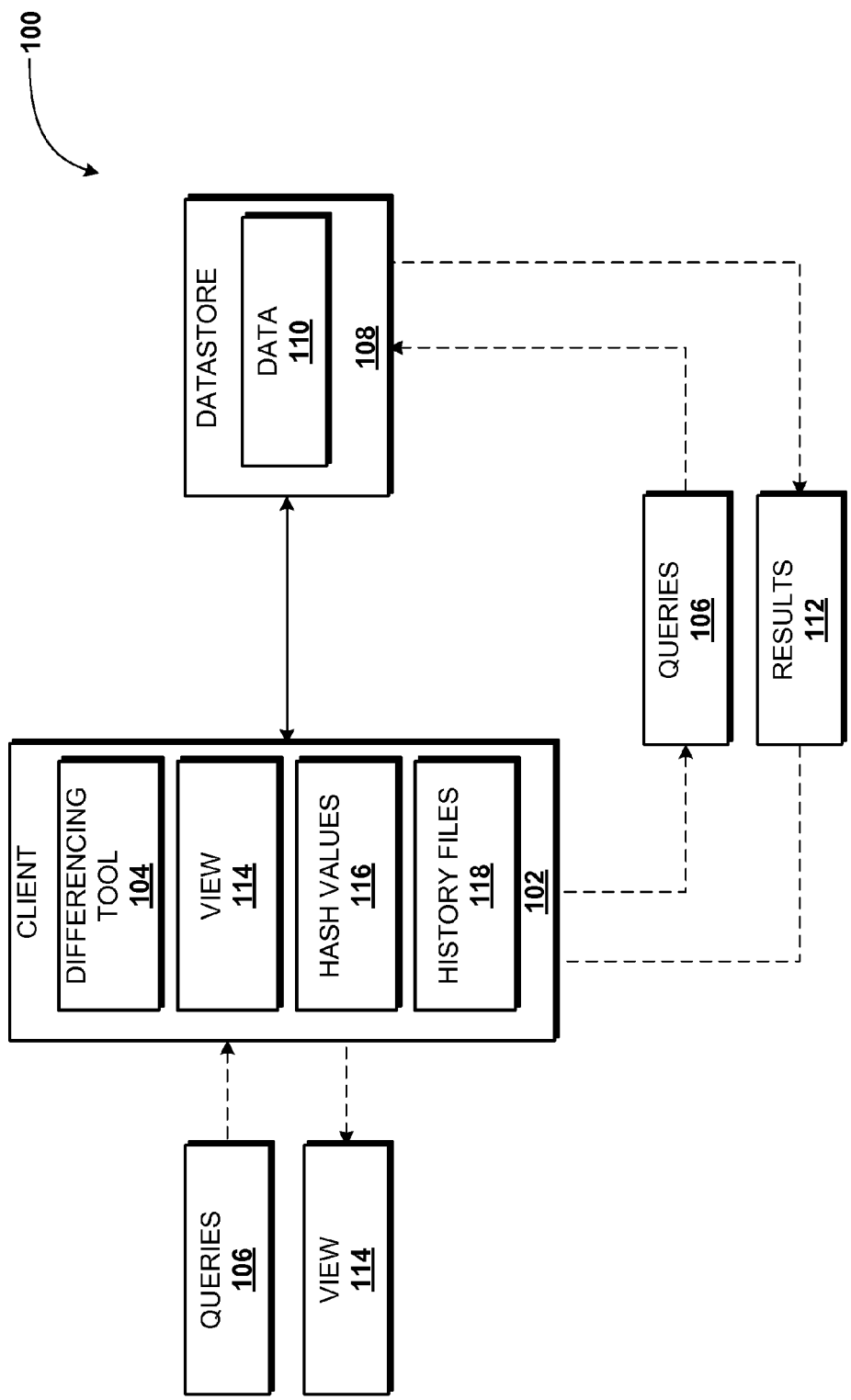
FIG. 1 is a system diagram illustrating an illustrative operating environment for the various embodiments disclosed herein.

The following detailed description is directed to concepts and technologies for presenting results with visual cues. According to the concepts and technologies described herein, a differencing tool is executed by a client or a server computer. The differencing tool is configured to generate or receive queries for querying data. The data can be hosted by a datastore in communication with the client or server computer. The differencing tool also is configured to obtain results satisfying the queries, which can be received or otherwise obtained from the datastore other devices configured to execute queries against the data.

The differencing tool further is configured to generate a view for presenting the results to a user or other entity. The view can include a grid view, table, window, and/or or other representation of data corresponding to the results. The view also can include controls for accessing additional functionality associated with the differencing tool such as histories associated with one or more of the results. As such, the differencing tool can store history data indicating values and/or time information associated with one or more iterations of the results. If requested, the history files can be used to update the view with the history data.

While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

In the following detailed description, references are made to the accompanying drawings that form a part hereof, and in which are shown by way of illustration specific embodiments or examples. Referring now to the drawings, in which like numerals represent like elements throughout the several figures, aspects of a computing system, computer-readable storage medium, and computer-implemented methodology for presenting results with visual cues will be presented.

Referring now to FIG. 1, aspects of one operating environment 100 for the various embodiments presented herein will be described. The operating environment 100 shown in FIG. 1 includes a client device ("client") 102. According to various embodiments, the functionality of the client 102 is provided by a personal computer ("PC") such as a desktop, tablet, or laptop computer system. The functionality of the client 102 also may be provided by other types of computing systems including, but not limited to, server computers, handheld computers, netbook computers, embedded computer systems, personal digital assistants, mobile telephones, smart phones, or other computing devices.

The client 102 is configured to execute an operating system (not illustrated) and one or more application programs such as, for example, a differencing tool 104 and/or other application programs. The operating system is a computer program for controlling the operation of the client 102. The differencing tool 104 is an executable program configured to execute on top of the operating system to provide the functionality described herein for presenting results with visual cues. While the illustrated embodiment shows the differencing tool 104 executed by the client 102, it should be understood that other embodiments are possible and are contemplated. In particular, in some embodiments the differencing tool 104 is executed by a server computer hosting the differencing tool 104 and controlled via commands received from the client 102 and/or other devices. Thus, the illustrated embodiment should be understood as being illustrative, and should not be construed as being limiting in any way.

The differencing tool 104 is configured to receive queries 106 generated at the client 102 or other devices in communication with a device hosting the differencing tool 104. The queries 106 can be submitted to a datastore 108 or other device that hosts or stores data 110 having any number of records. The datastore 108 also can host, or can be searched by other entities that host, one or more applications or modules configured to search the data 110 in accordance with the queries 106 submitted by the client 102. Responses to the queries 106 can include one or more search results ("results") 112 that satisfy the queries 106, as is generally understood.

For example, the data 110 can include contacts associated with a user, organization, or other entity. An example query 106 can search for contacts with names beginning with the letter "m," and results 112 satisfying the query 106 can include one or more contacts whose names begin with the letter "m." This example is illustrative, and should not be construed as being limiting in any way.

The functionality of the datastore 108 can be provided by one or more databases, server computers, desktop computers, mobile telephones, laptop computers, other computing systems, and the like. It should be understood that the functionality of the datastore 108 also can be provided by one or more virtual machines and/or otherwise hosted by a cloud computing environment, if desired. In other embodiments, the functionality of the datastore 108 can be provided by one or more data storage devices associated with the client 102 such as a memory, a mass storage device, computer-readable storage media as defined herein, combinations thereof, and the like. In the illustrated embodiments, the functionality of the datastore 108 is described as a server computer configured to response to structure query language ("SQL") queries. It should be understood that this embodiment is illustrative, and should not be construed as being limiting in any way.

The data 110 hosted or stored by the datastore 108 can be accessed by any number of users or systems over time. Additionally, operations or queries 106 received by or executed against the data 110 can change records in unexpected ways, and in ways that may or may not be readily apparent to the entity submitting the operations or queries 106. Furthermore, flaws, viruses, or other bugs in applications or storage media can create changes in the data 110 that are not purposefully made by a user or other entity. As such, the data 110, and therefore the contents of the results 112, can change over time. Therefore, if a similar or identical query 106 is submitted to or executed against the data 110 at two or more times, results 112 generated in response to the two or more instances of the query 106 can change relative to one another, though an operator or other entity associated with the client 102 may or may not be aware of any changes to the data 110 that prompted a change to the results 112.

According to various implementations disclosed herein, the differencing tool 104 is further configured to recognize changes to the data 110 including, but not limited to, the changes described above. In various implementations, the differencing tool 104 is configured to submit a query 106 to the datastore 108, receive results 112 from the datastore, and populate and present a view 114 to a user or other entity. The view 114 includes a visual representation such as a grid view, a window, a table, and/or other interfaces for presenting results 112 corresponding to the query 106. The differencing tool 104 is configured to start a timer when the query 106 is first submitted to the datastore 108, to resubmit the query 106 to the datastore 108 when the timer expires, to receive results 112 for the query 106, and to determine if the results 112 have changed relative to a previous set of results 112 received in response to the query 106. The time period enforced by the timer can be specified by settings, preferences, and/or in a data file received or created with the query 106.

The differencing tool 104 also is configured to indicate changes to the results 112 to a user or other entity if, during any iteration of receiving the results 112, the differencing tool 104 determines that a change to the results 112 has occurred. The differencing tool 104 can generate and present one or more visual cues with the view 114 to draw attention of the user or other entity to the changed results 112. According to various implementations, the visual cues can include changes to a color, font, style, or other aspects of text corresponding to changed results 112, alerts, warnings, or other messages, and/or other changes to the view 114.

According to some embodiments, the differencing tool 104 hashes the results 112 to obtain hash values 116 corresponding to the results 112, and stores the hash values 116 in a cache, memory, or other data storage device. The differencing tool 104 can generate the hash values 116 corresponding to the results 112 using a hashing algorithm or other code. In some embodiments, the results 112 are received as data stored in tables having rows, columns, and/or fields corresponding to individual data points. The differencing tool 104 can therefore be configured to generate the hash values 116 for one or more and/or a combination of rows, columns, fields, and/or other portions or sections of the results 112 when the results 112 are received.

When an iteration of the results 112 are received and hash values 116 are obtained, the differencing tool 104 can compare the hash values 116 for the results 112 to a previous set of hash values 116 for the results 112, which can be retrieved from cache, memory, or other data storage. Thus, recognizing that a change has occurred in the results 112 can include, in some embodiments, the differencing tool 104 recognizing that a hash value 116 for the results 112 is different relative to another hash value 116 stored for a previous iteration of the results 112. It should be understood that this embodiment is illustrative, and should not be construed as being limiting in any way.

The differencing tool 104 also can be configured to generate and store history files 118. The history files 118 include data identifying results 112 and their respective values at one or more iterations of a query 106. In some embodiments, the results 112 and their respective values are stored by the differencing tool 104 with time information such as a time stamp. The time stamp can include a time of day or other absolute measure of time, or a time relative to a timer and/or a number of iterations of the timer, if a timer is used. Thus, the time stamp can include run time information, which can be used to generate a history based upon the history files 118.

As will be illustrated and described in more detail below, the history files 118 can be used to modify the view 114 and/or to present historical information associated with the results 112 to a user or other entity. In some embodiments, a user can request a history associated with data in the view 114. The view 114 can present the historical information showing previous values for data in the view 114 as well as other information such as links to a query 106 or other command that caused changes to the data 110, time information showing when the changes occurred, links to view other information, combinations thereof, and the like. These and other features of the differencing tool 104 will be illustrated and described below with reference to FIGS. 2-4B.

FIG. 1 illustrates one client 102 and one datastore 108. It should be understood, however, that some implementations of the operating environment 100 include multiple clients 102 and/or multiple datastores 108. As such, the illustrated embodiments should be understood as being illustrative, and should not be construed as being limiting in any way.

Figure 2:
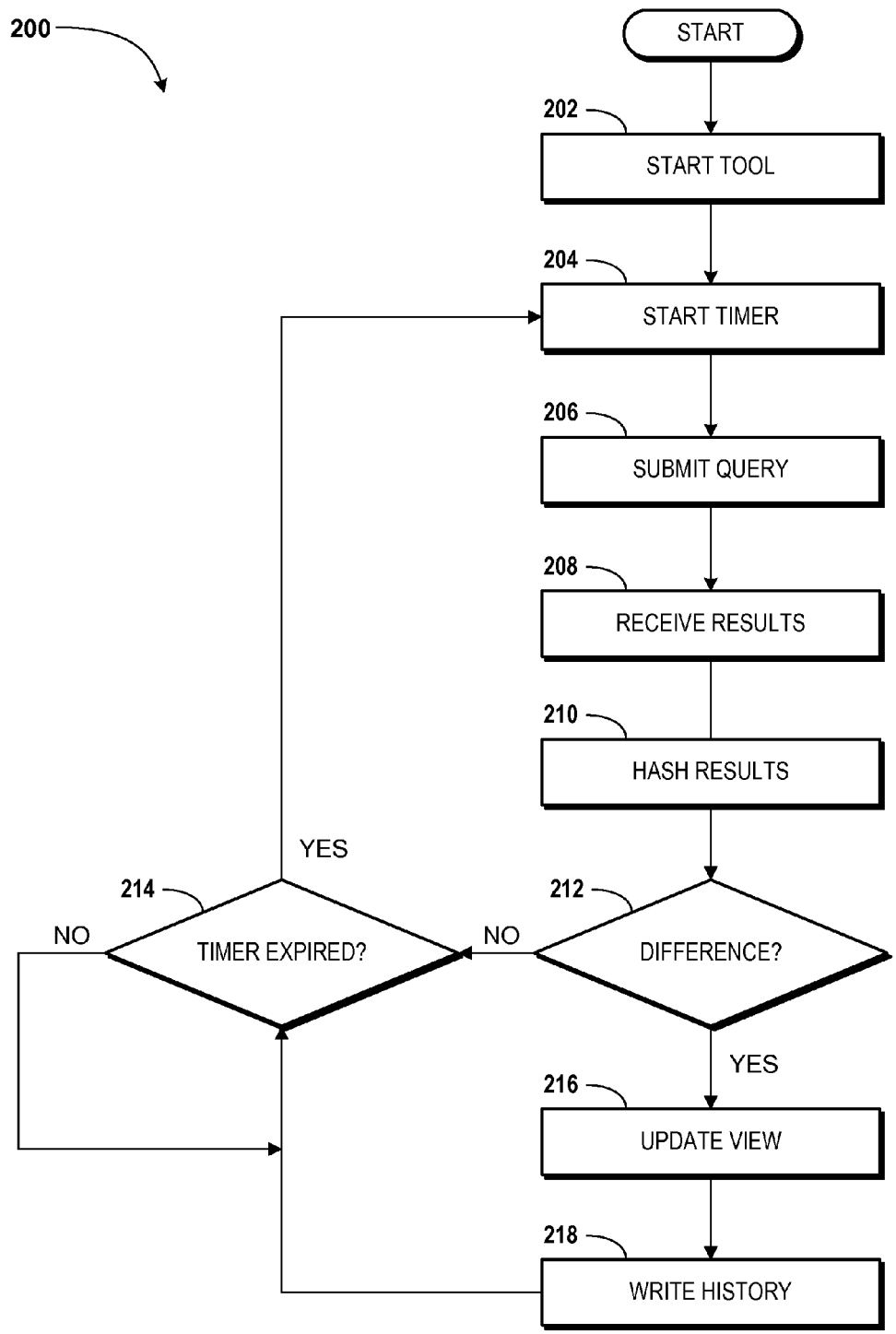
FIG. 2 is a flow diagram showing aspects of a method for presenting results with visual cues, according to an illustrative embodiment.

Turning now to FIG. 2, aspects of a method 200 for presenting results with visual cues will be described in detail. It should be understood that the operations of the method 200 disclosed herein are not necessarily presented in any particular order and that performance of some or all of the operations in an alternative order(s) is possible and is contemplated. The operations have been presented in the demonstrated order for ease of description and illustration. Operations may be added, omitted, and/or performed simultaneously, without departing from the scope of the appended claims.

It also should be understood that the illustrated method 200 can be ended at any time and need not be performed in its entirety. Some or all operations of the method 200, and/or substantially equivalent operations, can be performed by execution of computer-readable instructions included on a computer-storage media, as defined above. The term "computer-readable instructions," and variants thereof, as used in the description and claims, is used expansively herein to include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These operations, structural devices, acts, and modules may be implemented in software, in firmware, in special purpose digital logic, and any combination thereof.

For purposes of illustrating and describing the concepts of the present disclosure, the method 200 disclosed herein is described as being performed by the differencing tool 104, wherein the differencing tool 104 is executed by the client 102. As explained herein, the differencing tool 104 can be executed or hosted by a server computer or other device in communication with the client 102, and the differencing tool 104 can be configured to be controlled via commands received from the client 102 and/or other devices in communication with the server computer or the like. As such, it should be understood that the described embodiments are illustrative, and should not be viewed as being limiting in any way.

The method 200 begins at operation 202, wherein the differencing tool 104 is started. The differencing tool 104 can be started by a user, by software, and/or by hardware. Starting the differencing tool 104 can include configuring, inputting, or receiving a query 106. In some embodiments, a configuration file such as an extensible markup language ("XML") file and/or other types of files are submitted to or retrieved by the differencing tool 104. The configuration files can include data indicating a query 106, time periods for use by the timer, and/or other information for controlling operation of the differencing tool 104. It should be understood that these embodiments are illustrative, as the query 106, the time periods, and/or other configuration information can be entered at the client 102 and/or received from other or additional sources. Thus, the illustrated embodiments should not be construed as being limiting in any way.

From operation 202, the method 200 proceeds to operation 204, wherein the differencing tool 104 starts a timer. The timer can be used to track a time period that passes between submissions of the query 106 to the datastore 108. As explained herein, the query 106 can be run against the data 110 stored at the datastore 108 each time the timer expires. In some embodiments, the timer is set for one or more milliseconds, one or more seconds, and/or any other desired time periods. In some embodiments, the time period is extremely short or set to zero such that the query 106 is immediately resubmitted after each submission. As such, changes to the data 110 can be recognized in real time or nearly real time. As mentioned above, the time period enforced or used by the timer can be set by a user, preferences, settings, or other controls, and/or received in or parsed from one or more files such as, for example, one or more XML files that are parsed by the differencing tool 104. Other embodiments are possible and are contemplated.

From operation 204, the method 200 proceeds to operation 206, wherein the differencing tool 104 submits the query 106 to the datastore 108. As explained herein, the differencing tool 104 can format or reformat the query 106 and submit the query to the datastore 108 or another device configured to execute queries against the data 110 stored at the datastore 108. Additionally, as explained above, the query 106 can be submitted to one or more devices configured to search the data 110 stored at the datastore 108, and therefore may not be submitted to the datastore 108.

From operation 206, the method 200 proceeds to operation 208, wherein the differencing tool 104 receives results 112. As explained herein, the results 112 can be received from the datastore 108. Additionally, or alternatively, the results 112 can be received from the one or more devices configured to execute the queries 106 against the data 110.

From operation 208, the method 200 proceeds to operation 210, wherein the differencing tool 104 hashes the results 112 received at operation 208 to generate the hash values 116, if desired. As explained herein, the results 112 can be used to populate a table, window, or other representation of the data 110 as the view 114. The values of each field, row, column, or other section or portion of the view 114 can be hashed to obtain the hash value 116 corresponding to the results 112 and/or fields, rows, columns, or other sections or portions of the results 112. The differencing tool 104 can compare the hash values 116 corresponding to the results 112, and/or the fields, rows, columns, or other sections or portions of the results 112, as will be explained below with reference to operation 212. As noted above, some operations of the method 200, including operation 208, can be omitted. Thus, It should be understood that the differencing tool 104 can be configured to compare results 112 using additional and/or alternative functionality without hashing as shown in operation 210.

From operation 210, the method 200 proceeds to operation 212, wherein the differencing tool 104 determines if the results 112 received in operation 208 have changed relative to a previous version of the results 112 received or stored by the differencing tool 104. As mentioned above, in some embodiments, operation 212 includes comparing one or more hash values 116 corresponding to one or more iterations of the query 106. If the results 112 received in operation 208 are the first results 112 received by the differencing tool 104, then the method 200 can proceed as if the differencing tool 104 determines in operation 212 that the results 112 have changed, as will be described below.

If the differencing tool 104 determines, in operation 212, that the results 112 have not changed, the method 200 proceeds to operation 214. At operation 214, the differencing tool 104 determines if the timer started at operation 204 has expired. If the timer started at operation 204 has not expired, the method 200 returns to operation 214. Operation 214 can be iterated until the differencing tool 104 determines that the timer started in operation 204 has expired. If the difference application 104 determines, in any iteration of operation 214, that the timer started in operation 204 has expired, the method 200 returns to operation 204, wherein the timer is again started, and flow of the method 200 can proceed as described herein.

If the differencing tool 104 determines, at operation 212, that the results 112 received in operation 208 have changed relative to a previous version of the results 112 received or stored by the differencing tool 104, the method 200 proceeds to operation 216. At operation 216, the differencing tool 104 updates the view 114 for presenting the results 112 to a user or other entity. According to various implementations, as illustrated and described below with reference to FIGS. 3A-4B, the differencing tool 104 can update the view 114 for presenting the results 112 and present the view 114 to the user or other entity.

The differencing tool 104 can update the view 114 to include one or more visual cues. In particular, the differencing tool 104 can generate and present one or more visual cues with the results 112 shown in the view 114 to indicate that the results 112 have changed. According to various implementations, some of which are described below with reference to FIGS. 3B-3C, results 112 in the view 114, or portions thereof, can be highlighted, displayed in bold text, displayed in alternative colors or color schemes, displayed in blinking text, animated, and/or otherwise modified to indicate that the results 112 have changed.

From operation 216, the method 200 proceeds to operation 218, wherein the differencing tool 104 writes history information indicating values for the results 112 in the view 114 at a particular time. The history information can include values for the results 112 as well as time stamps. The time stamps can indicate an absolute time value, or can be based upon a value of the timer started in operation 204 and/or an iteration number of the timer started in operation 204. It should be understood that these embodiments are illustrative, and should not be construed as being limiting in any way.

The history information can be stored by the differencing tool 104 as the history files 118. As explained above, the history files 118 can be stored at the client 102 and/or at data storage devices accessible by the client 102, if desired. From operation 218, the method 200 can proceed to operation 214, wherein the differencing tool 104 determines if the timer started in operation 204 has expired. The method 200 can be iterated indefinitely until the differencing tool 104 is stopped, or until the method 200 is interrupted.

Figure 3A:
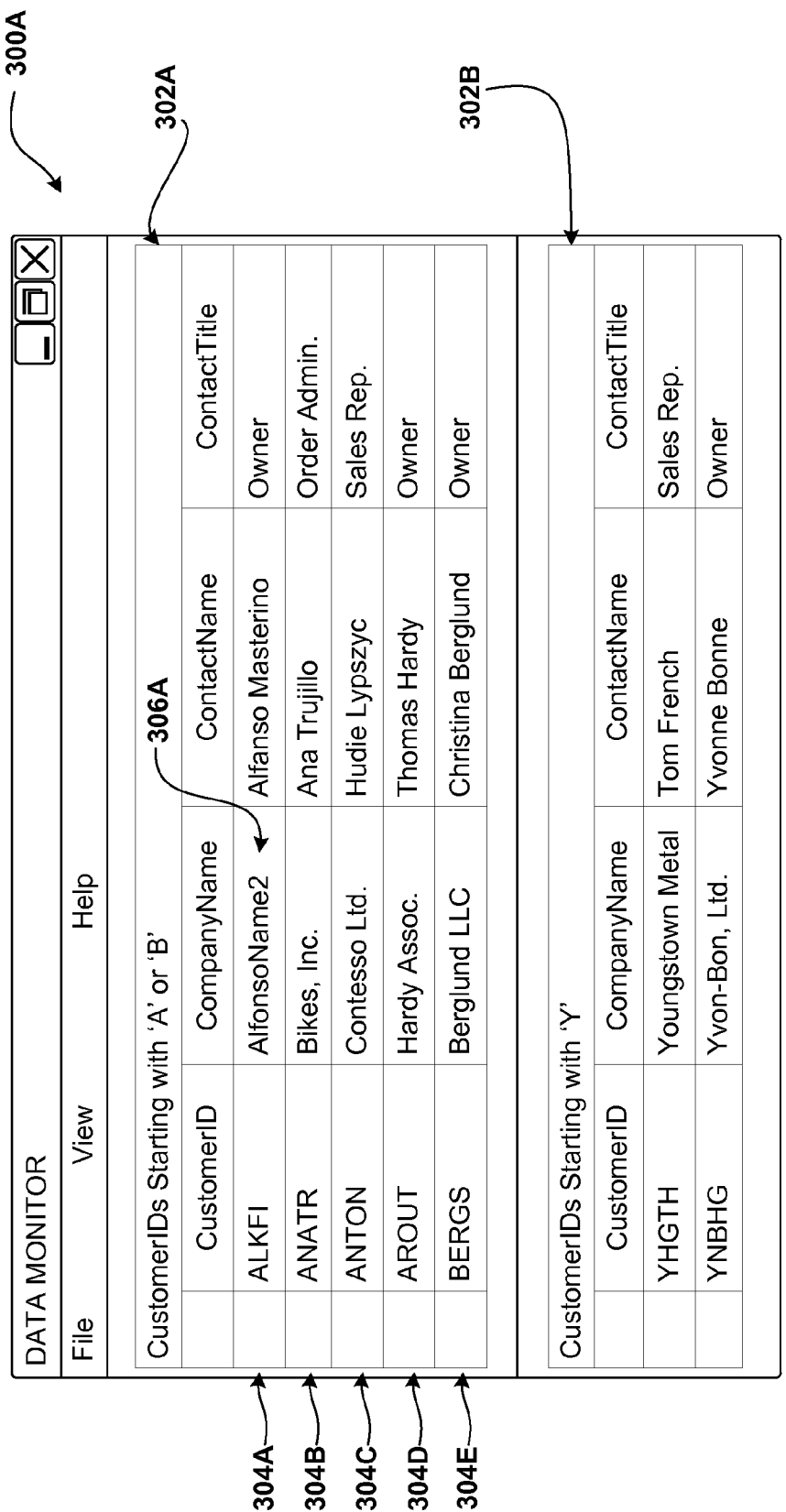
FIGS. 3A-3C are user interface diagrams showing aspects of exemplary user interfaces for presenting result sets at a client device, according to various embodiments.

Turning now to FIG. 3A, a user interface diagram showing aspects of a user interface ("UI") for presenting results with visual cues in one embodiment will be described. In particular, FIG. 3A shows a screen display 300A generated by the differencing tool 104 according to one particular implementation presented herein for presenting the view 114. It should be appreciated that the UI diagram illustrated in FIG. 3A is illustrative of one contemplated embodiment, and therefore should not be construed as being limited in any way.

The screen display 300A shown in FIG. 3A includes various tool bar and menu items. It should be understood that the illustrated tool bar and menu items are merely illustrative, and that additional and/or alternative tool bar and/or menu items are possible and are contemplated. In the illustrated embodiment, the screen display 300A includes a data monitor window 300A. The data monitor window 300A can be generated by the differencing tool 104, as explained above in detail with reference to FIGS. 1-2.

In the illustrated embodiment, the data monitor window 300A displays two customizable data monitors 302A-B, which individually and/or collectively can display the view 114 corresponding to the results 112. As noted above, the view 114 can be generated by the differencing tool 104. The customizable data monitor 302A includes a number of records, which are displayed in the illustrated embodiment as the rows 304A-E. Although the customizable data monitor 302A can be configured to display any desired information, in the illustrated embodiment, the customizable data monitor 302A displays records in the data 110 that include a "CustomerID" value that begins with the letters A or B. Similarly, the customizable data monitor 302B displays records in the data 110 that include a "CompanyName" value that begins with the letter Y. It should be understood that these embodiments are illustrative, and should not be construed as being limiting in any way. Furthermore, the display of the records in rows 304 should be understood as illustrative, as the records can be displayed in any desired format including, but not limited to, lists, rows, columns, fields, other sections or portions, other formats, combinations thereof, and the like.

In the illustrated embodiment, the row 304A corresponds to a record having various attributes. Among the various attributes are a company name, reflected in a field within the column labeled "CompanyName." As shown, the record corresponding to row 304A includes a value 306 of "AlfansoName2" for the company name. It should be appreciated that if the data 110 from which the customizable data monitor 302A is generated is changed, the view shown in FIG. 3A can be updated, as described above and as illustrated and described below with reference to FIGS. 3B-4A. In particular, if the value for the "CompanyName" associated with the record corresponding to row 302A is changed, the value 306 can be updated and displayed to a user with one or more visual cues indicating the change.

Turning briefly to FIGS. 4A and 4B, updating of the data 110 is illustrated according to some embodiments. In particular, FIG. 4A illustrates an example table 400A. The table 400A corresponds to a portion of the data 110 upon which the view 114 presented as the customizable data monitor 302A is based. The data 110 can be arranged into any format or configuration. For purposes of illustration, the data 110 is illustrated in FIG. 4A as being stored as the table 400A having a number of rows 402A-G. It should be understood that this embodiment is illustrative, and should not be construed as being limiting in any way.

The values shown in row 402F of FIG. 4A can correspond to the values shown in row 304A of the customizable data monitor 302A of FIG. 3A, though this is not necessarily the case. The row 402F can therefore include a company name having a value 404A of "AlfansoName2," as illustrated by the value 306A of FIG. 3A. To illustrate the concepts and technologies disclosed herein, FIG. 4B illustrates updating of the value 404A illustrated in FIG. 4A to a new value 404B. In particular, as shown in FIG. 4B, the table 400 can be updated to obtain the table 400B, for example via receipt of a command or action at the datastore 108. After updating the table 400A to obtain the table 400B, the value 404B of the company name in row 402F can read "AlfansoName3." The updating of the customizable data monitors 302A to reflect the change made to the data 110 as illustrated in FIGS. 4A-4B are illustrated and described below with reference to FIGS. 3B-3C.

Figure 3B:
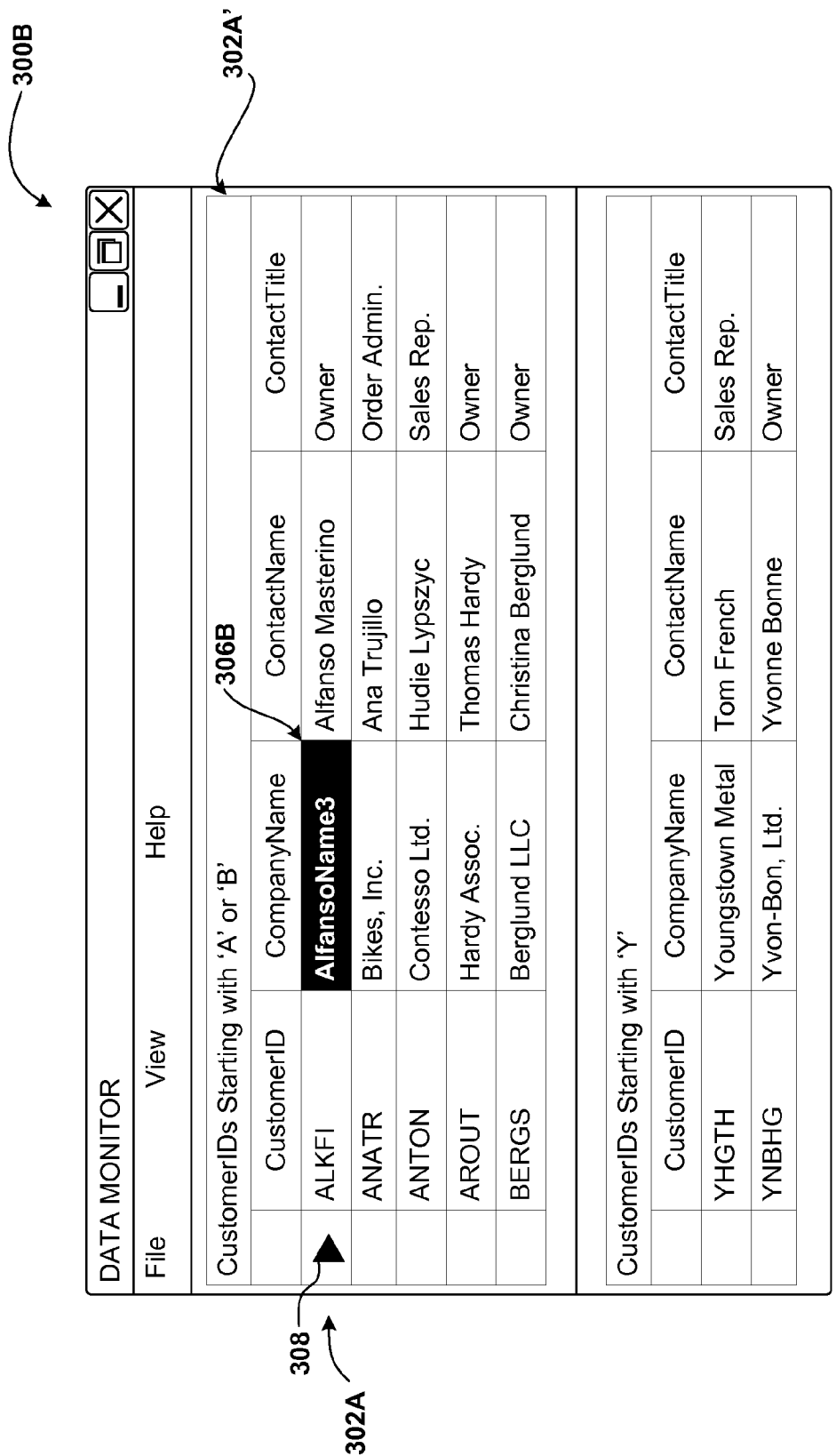

Referring now to FIG. 3B, updating of the view 114 presented as the customizable data monitors 302A, 302A' is illustrated, according to some contemplated embodiments. As shown, the value 306A can be updated to reflect the change described above with reference to FIGS. 4A-4B. Thus, a new value 306B can be shown in the customizable data monitor 302'. In addition to updating the value 306A to obtain the new value 306B, other visual cues can be used to indicate to a user or other entity that the value 306A has changed.

FIG. 3B illustrates four example visual cues, though additional and/or alternative visual cues are possible and are contemplated. In particular, FIG. 3B illustrates the new value 306B, as well as a row indicator 308 displayed adjacent to the row 302A. The row indicator 308 can, but does not necessarily, indicate that the row 302A is an active row or that the row 302A contains a value that has changed. Additionally, the field displaying the new value 306A for the CompanyName can be highlighted and/or the text can be displayed in an alternative style, font, color, or other characteristic to indicate the change. It should be understood that these embodiments are illustrative, and should not be construed as being limiting in any way.

The visual cues can be persisted for any desired duration of time. It should be understood that the duration of time for or during which the visual cues are displayed can be adjusted by users or other entities, set via preferences or settings, and/or otherwise set or adjusted. In some implementations, some or all of the visual cues can persist until a subsequent change in the data 110 is recognized by the differencing tool 104, until a user or other entity acknowledges the change indicated by the visual cues, for a set period of time, and/or for other durations. It should be understood that these embodiments are illustrative, and should not be construed as being limiting in any way. According to various implementations of the concepts and technologies disclosed herein, a history of the values 306A, 306B and/or any other changed values can be generated and displayed for a user or other entity, as shown below with reference to FIG. 3C.

Figure 3C:
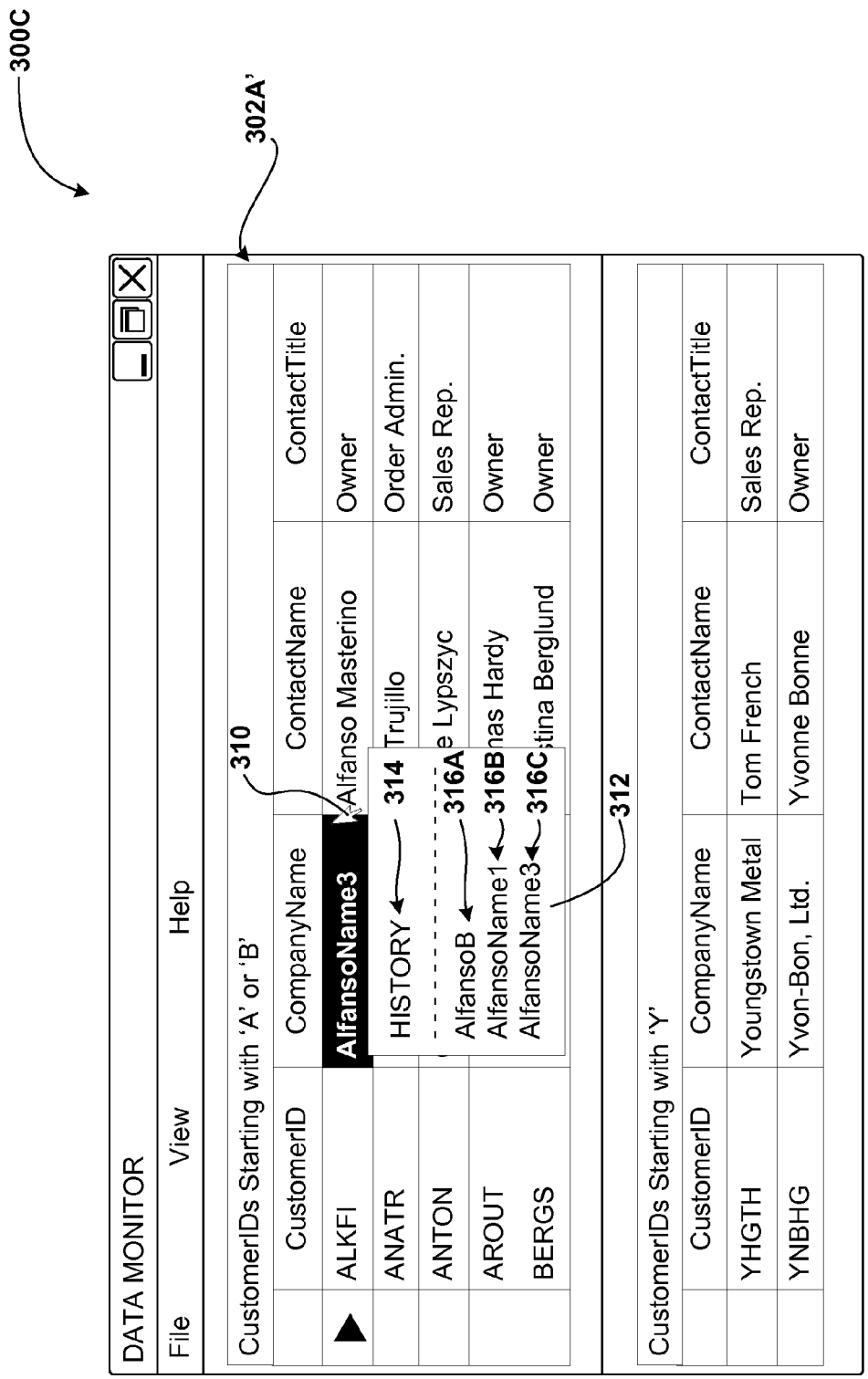

As shown in FIG. 3C, a history view window 310 can be displayed in response to selection of a UI control for displaying the history view window 310. The history view window 310 can present data corresponding to the history files 118. As mentioned above, one or more values stored in the history files 118 can include time stamps and/or other information. As such, the history files 118 can show history associated with a particular value with respect to one or more times.

In the illustrated embodiment, the history view window 310 is displayed in response to a user or other entity hovering a mouse pointer 312 over the changed value 306. It should be understood that this embodiment is illustrative, and should not be construed as being limiting in any way. More particularly, a user may click on the field containing the value 306, touch or swipe a display at or near the field containing the value 306, and/or use other inputs or gestures to indicate a desire to view the history view window 310.

This history view window 310 can include a heading 314 and a number of values 316A-C. The values 316A-C can correspond to values observed for the field clicked on or hovered over to present the history view window 310. The values 316A-C can be arranged in chronological, alphabetical, and/or other orders, if desired. In the illustrated embodiment, the values 316A-C are arranged in chronological order, with the most recent value 316C listed at the bottom of the history view window 310. It should be understood that this embodiment is illustrative, and should not be construed as being limiting in any way. A user or other entity observing the history view window 310 can determine that a value associated with the company name for row 302A has changed from "AlfansoB" at a first time to "AlfansoName1" at a second time. Similarly, the value associated with the company name for row 302A has changed from "AlfansoName1" at the second time to "AlfansoName2" at a third time. As such, the new value 306B illustrated in FIGS. 3B-3C can correspond to a value for the company name at a fourth time. It should be understood that this embodiment is illustrative, and should not be construed as being limiting in any way.

Although not illustrated in FIG. 3C, it should be understood that the history view window 310 can include additional and/or alternative information. In particular, in some embodiments, the values 316A-C are presented with time information for indicating a time stamp associated with the respective values 316A-C. Additionally, or alternatively, the history view window 310 can present links to representations of queries or commands that prompted one or more changes to the data 110 that resulted in the values 316A-C. Other information can be presented in the history view window 310. As such, the illustrated embodiment should be understood as illustrative, and should not be construed as being limited in any way.

Figure 5:
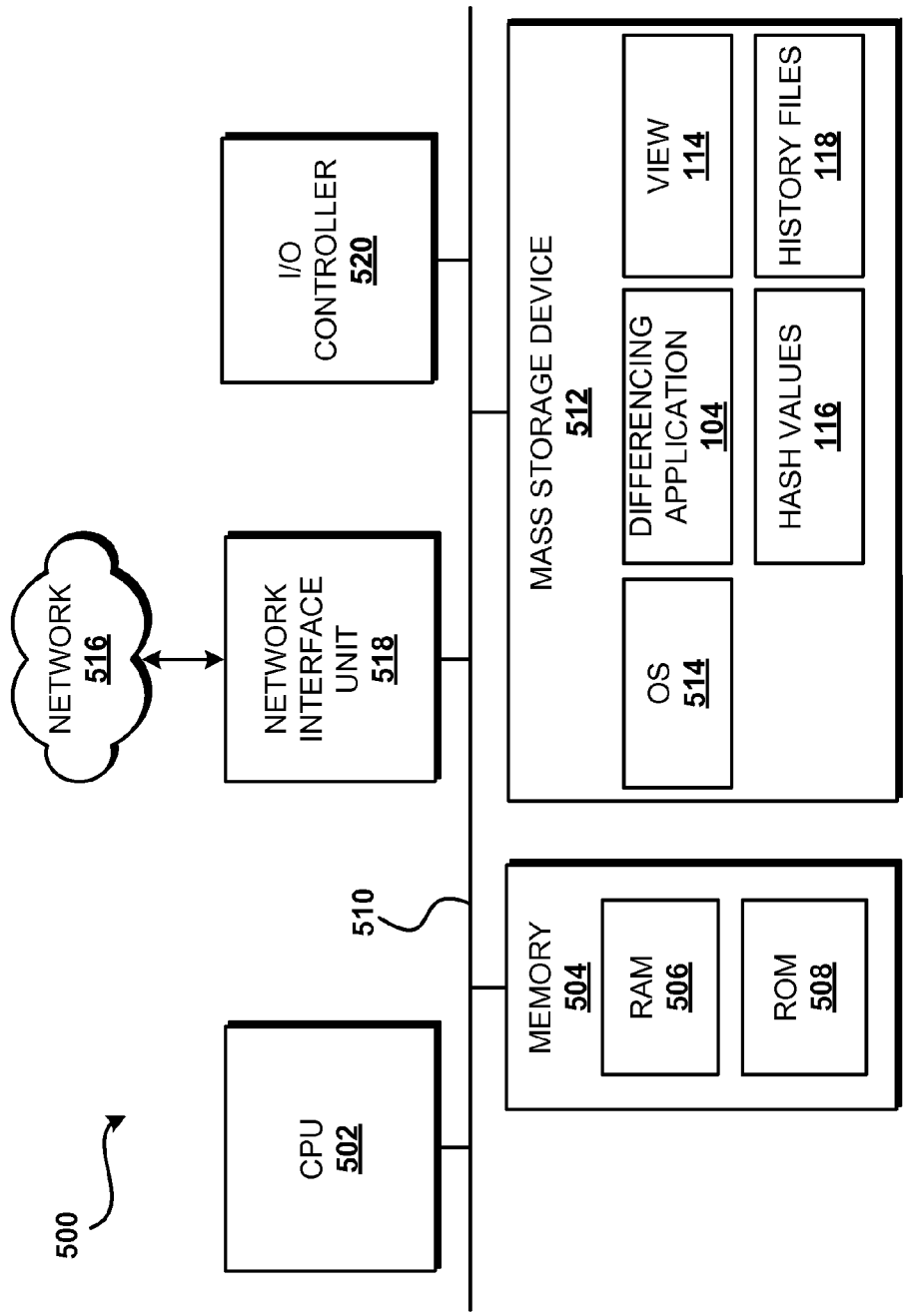
FIG. 5 is a computer architecture diagram illustrating an illustrative computer hardware and software architecture for a computing system capable of implementing aspects of the embodiments presented herein.

FIG. 5 illustrates an illustrative computer architecture 500 for a device capable of executing the software components described herein for presenting results with visual cues. Thus, the computer architecture 500 illustrated in FIG. 5 illustrates an architecture for a server computer, mobile phone, a PDA, a smart phone, a desktop computer, a netbook computer, a tablet computer, and/or a laptop computer. The computer architecture 500 may be utilized to execute any aspects of the software components presented herein.

The computer architecture 500 illustrated in FIG. 5 includes a central processing unit 502 ("CPU"), a system memory 504, including a random access memory 506 ("RAM") and a read-only memory ("ROM") 508, and a system bus 510 that couples the memory 504 to the CPU 502. A basic input/output system containing the basic routines that help to transfer information between elements within the computer architecture 500, such as during startup, is stored in the ROM 508. The computer architecture 500 further includes a mass storage device 512 for storing the operating system 514, the differencing tool 104, the view 114, the has values 116, and the history files 118. Although not shown in FIG. 5, the mass storage device 512 can be configured to store the data 110, if desired.

The mass storage device 512 is connected to the CPU 502 through a mass storage controller (not shown) connected to the bus 510. The mass storage device 512 and its associated computer-readable media provide non-volatile storage for the computer architecture 500. Although the description of computer-readable media contained herein refers to a mass storage device, such as a hard disk or CD-ROM drive, it should be appreciated by those skilled in the art that computer-readable media can be any available computer storage media or communication media that can be accessed by the computer architecture 500.

Communication media includes computer readable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

By way of example, and not limitation, computer storage media may include volatile and non-volatile, removable and non-removable media implemented in any method or technology for storage of information such as computer-readable instructions, data structures, program modules or other data. For example, computer media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information and which can be accessed by the computer architecture 500. For purposes the claims, the phrase "computer storage medium" and variations thereof, does not include waves, signals, and/or other transitory and/or intangible communication media, per se.

According to various embodiments, the computer architecture 500 may operate in a networked environment using logical connections to remote computers through a network 516. The computer architecture 500 may connect to the network 516 through a network interface unit 518 connected to the bus 510. It should be appreciated that the network interface unit 518 also may be utilized to connect to other types of networks and remote computer systems. The computer architecture 500 also may include an input/output controller 520 for receiving and processing input from a number of other devices, including a keyboard, mouse, or electronic stylus (not shown in FIG. 5). Similarly, the input/output controller 520 may provide output to a display screen, a printer, or other type of output device (also not shown in FIG. 5).

It should be appreciated that the software components described herein may, when loaded into the CPU 502 and executed, transform the CPU 502 and the overall computer architecture 500 from a general-purpose computing system into a special-purpose computing system customized to facilitate the functionality presented herein. The CPU 502 may be constructed from any number of transistors or other discrete circuit elements, which may individually or collectively assume any number of states. More specifically, the CPU 502 may operate as a finite-state machine, in response to executable instructions contained within the software modules disclosed herein. These computer-executable instructions may transform the CPU 502 by specifying how the CPU 502 transitions between states, thereby transforming the transistors or other discrete hardware elements constituting the CPU 502.

Encoding the software modules presented herein also may transform the physical structure of the computer-readable media presented herein. The specific transformation of physical structure may depend on various factors, in different implementations of this description. Examples of such factors may include, but are not limited to, the technology used to implement the computer-readable media, whether the computer-readable media is characterized as primary or secondary storage, and the like. For example, if the computer-readable media is implemented as semiconductor-based memory, the software disclosed herein may be encoded on the computer-readable media by transforming the physical state of the semiconductor memory. For example, the software may transform the state of transistors, capacitors, or other discrete circuit elements constituting the semiconductor memory. The software also may transform the physical state of such components in order to store data thereupon.

As another example, the computer-readable media disclosed herein may be implemented using magnetic or optical technology. In such implementations, the software presented herein may transform the physical state of magnetic or optical media, when the software is encoded therein. These transformations may include altering the magnetic characteristics of particular locations within given magnetic media. These transformations also may include altering the physical features or characteristics of particular locations within given optical media, to change the optical characteristics of those locations. Other transformations of physical media are possible without departing from the scope and spirit of the present description, with the foregoing examples provided only to facilitate this discussion.

In light of the above, it should be appreciated that many types of physical transformations take place in the computer architecture 500 in order to store and execute the software components presented herein. It also should be appreciated that the computer architecture 500 may include other types of computing devices, including hand-held computers, embedded computer systems, personal digital assistants, and other types of computing devices known to those skilled in the art. It is also contemplated that the computer architecture 500 may not include all of the components shown in FIG. 5, may include other components that are not explicitly shown in FIG. 5, or may utilize an architecture completely different than that shown in FIG. 5.

Based on the foregoing, it should be appreciated that technologies for presenting results with visual cues have been disclosed herein. Although the subject matter presented herein has been described in language specific to computer structural features, methodological and transformative acts, specific computing machinery, and computer readable media, it is to be understood that the invention defined in the appended claims is not necessarily limited to the specific features, acts, or media described herein. Rather, the specific features, acts and mediums are disclosed as example forms of implementing the claims.

The subject matter described above is provided by way of illustration only and should not be construed as limiting. Various modifications and changes may be made to the subject matter described herein without following the example embodiments and applications illustrated and described, and without departing from the true spirit and scope of the present invention, which is set forth in the following claims.

I claim:

1. A computer-implemented method for presenting results with visual cues, the computer-implemented method comprising performing computer-implemented operations for:
submitting a query for querying data associated with a datastore;
obtaining, in response to the query, a first version of results satisfying the query;
generating a view for presenting the results and presenting the first version of the results in the view;
resubmitting the query for querying the data associated with the datastore;
obtaining, in response to the resubmitted query, a second version of the results;
determining if the view for presenting the results is to be updated, based upon the first version of the results and the second version of the results;
updating the view using the second version of the results, in response to determining that the view for presenting the results is to be updated; and
writing a history file comprising data indicating the first version of the results and the second version of the results and a time associated with a corresponding version of the results.

2. The method of claim 1, further comprising starting a timer in response to submitting the query, the timer configured to track a time period.

3. The method of claim 2, further comprising:
determining if the timer has expired; and
in response to determining that the timer has expired, restarting the timer, wherein the query is resubmitted in response to determining that the timer has expired.

4. The method of claim 2, wherein the time period is parsed from an extensible markup language configuration file.

5. The method of claim 1, wherein determining if the view for presenting the results is to be updated comprises determining if there is a difference between the first version of the results and the second version of the results.

6. The method of claim 5, further comprising hashing the first version of the results and the second version of the results to obtain a set of hash values for each of the first version and the second version of the results.

7. The method of claim 6, wherein determining if there is a difference between the first version of the results and the second version of the results comprises comparing each of the set of hash values of the first version of the results to a corresponding hash value of the second version of the results.

8. The method of claim 1, wherein the view for presenting the results comprises a visual representation of the results.

9. The method of claim 8, wherein updating the view comprises:
updating a value associated with at least one of the results presented in the view; and
generating a visual cue for informing an entity that the value associated with the at least one of the results has changed.

10. The method of claim 1, further comprising modifying the view to include history data from the history file.

11. A computer-implemented method for presenting results with visual cues, the computer-implemented method comprising performing computer-implemented operations for:
determining a time period associated with a query;
starting a timer, the timer configured to expire at the end of the time period;
submitting the query to a datastore configured to query data based upon the query;
obtaining, in response to the query, results satisfying the query;
determining if a view for presenting the results is to be updated, based upon the results obtained;
updating the view using the results obtained, in response to determining that the view for presenting the results is to be updated;
not updating the view, in response to determining that the view for presenting the results is not to be updated;
writing a history file comprising data indicating the results and a time associated with the results;
determining if the timer has expired; and
in response to determining that the timer has expired, restarting the timer and resubmitting the query.

12. The method of claim 11, further comprising:
hashing the results to obtain one or more hash values for the results; and
determining if there is a difference between the results obtained and a previous version of the results by comparing the hash values to hash values corresponding to the previous version of the results.

13. The method of claim 11, further comprising presenting a view representing the results, the view comprising a visual representation of the results, wherein updating the view comprises updating a value associated with at least one of the results, and generating a visual cue for informing an entity that the value associated with the at least one of the results has changed.

14. The method of claim 13, wherein presenting the view comprises generating a user interface for presenting the results, the user interface comprising a control for obtaining a history view.

15. The method of claim 14, further comprising:

in response to receiving selection of the control, obtaining history data from the history file, and presenting the history data in the history view.

16. A computer storage medium having computer readable instructions stored thereupon that, when executed by a computer, cause the computer to:

determine a time period associated with a query, the time period being determined from a configuration file;

start a timer, the timer configured to expire at the end of the time period;

submit the query to a device configured to query data associated with a datastore based upon the query;

obtain, in response to the query, a first version of results satisfying the query;

generate a view for presenting the results and present the first version of the results in the view;

determine if the timer has expired;

in response to determining that the timer has expired, restart the timer and resubmit the query;

obtain, in response to the resubmitted query, a second version of the results;

determine if the view for presenting the results is to be updated, based upon the first version of the results and the second version of the results;

update the view using the second version of the results, in response to determining that the view for presenting the results is to be updated; and write a history file comprising data indicating the first version of the results and the second version of the results and a time associated with a corresponding version of the results.

17. The computer storage medium of claim 16, further comprising computer readable instructions that, when executed by the computer, cause the computer to:

hash each of the first version of the results and the second version of the results to obtain hash values for each of the first version and the second version of the results; and determine if there is a difference between the hash values for the first version of the results and the hash values for the second version of the results.

18. The computer storage medium of claim 16, further comprising computer readable instructions that, when executed by the computer, cause the computer to:

present the view by generating a user interface for presenting the results, the user interface comprising a control for obtaining a history view; and in response to receiving selection of the control, obtaining history data from the history file and presenting the history data in the history view.

* * * * *